US005862211A

United States Patent [19]
Roush

[11] Patent Number: 5,862,211
[45] Date of Patent: Jan. 19, 1999

[54] AUTOMATIC SIMULTANEOUS VOICE-AND-DATA CALL SETUP FOR REMOTE-SITE SERVICING

[75] Inventor: Charles S. Roush, Boulder, Colo.

[73] Assignee: Lucent Technologies Inc., Murray Hill, N.J.

[21] Appl. No.: 784,728

[22] Filed: Jan. 13, 1997

[51] Int. Cl.⁶ .............................. H04Q 3/64; H04M 3/08; H04M 3/22; H04M 11/00
[52] U.S. Cl. .......................... 379/309; 370/493; 375/220; 379/29; 379/93.28; 379/225; 379/265
[58] Field of Search .................................. 370/493, 494, 370/495; 375/220; 379/93.01, 93.14, 93.28, 93.29, 93.31, 93.32, 93.33, 93.34, 93.36, 1, 9, 15, 29, 265, 266, 309, 219, 225

[56] References Cited

U.S. PATENT DOCUMENTS

| | | | |
|---|---|---|---|
| 4,972,453 | 11/1990 | Daniel, III et al. ........................ | 379/10 |
| 5,428,608 | 6/1995 | Freeman et al. .................. | 379/93.28 X |
| 5,572,570 | 11/1996 | Kuenzig ................................ | 379/29 X |
| 5,602,846 | 2/1997 | Holmquist et al. .................. | 370/493 X |
| 5,625,677 | 4/1997 | Feiertag et al. ................... | 379/93.28 X |
| 5,684,825 | 11/1997 | Ko ..................................... | 379/93.34 X |
| 5,696,809 | 12/1997 | Voit ..................................... | 379/265 X |

OTHER PUBLICATIONS

Electronic article, NB950628.27@clarinet.com, newsbytes@clarinet.com, Birmingham, England, 1996 Jun. 28, pp. 1 & 2.

K. R. Klein, Jr. et al., *Combining Voice and Data on a POTS Line*, AT&T Technology, vol. 10, No. 1, Spring 1995, pp. 24–27.

*AT&T Set Taps DSVD Spec*, Electronic Engineering Times, Jun. 19, 1995.

*VoiceView and DSVD: A Technology Perspective*, Technology Backgrounder, date unknown, pp. 1 & 2.

*Supercharging The Web With Computer Telephony*, Computer Telephony, vol. 4, Iss. 3, Mar. 1996, pp. 170–196.

*Primary Examiner*—Harry S. Hong
*Attorney, Agent, or Firm*—David Volejnicek

[57] ABSTRACT

Simultaneous voice-and-data (SVD) modems (106, 156) are employed automatically in a call initiated between a telephone (111) of a remotely-serviceable communications switching system (101) and a telephone (161) of a service center (150) that includes either a maintenance and diagnostics system (165) or maintenance and diagnostics workstations (162). The remotely-serviceable communications switching system automatically connects the voice portion of a single SVD call set up by the SVD modem to its associated telephone and automatically connects the data portion of the SVD call to its remote maintenance and diagnostics port (109). An automatic call distribution (ACD) communications switching system (151) of the service center automatically connects the voice portion of the SVD call to a telephone (161) of one of its agents (163) and automatically connects the data portion of the SVD call to the maintenance and diagnostics system or workstation. The maintenance and diagnostics system or the service agent immediately starts servicing the remotely-serviceable communications switching system via the single SVD call while the agent is handling the voice portion of the SVD call. The maintenance and diagnostics system preferably reports results to a data terminal (162) of the agent while the agent is still handling the voice portion of the SVD call.

9 Claims, 2 Drawing Sheets

AUTOMATIC SIMULTANEOUS VOICE-AND-DATA CALL SETUP FOR REMOTE-SITE SERVICING

TECHNICAL FIELD

This invention relates generally to telecommunications systems, and relates specifically to servicing of remote sites over telecommunications links.

BACKGROUND OF THE INVENTION

Remote-site servicing systems are well known in the art. Generally, they establish a communications connection to the remote site and then interrogate the remote site—be it a telecommunications system, a computer, or some other equipment—via the connection to perform maintenance and diagnostics thereon. An illustrative example of such a remote-site servicing system is disclosed in U.S. Pat. No. 4,972,453.

Commonly, accessing of the remote site by the servicing system is triggered by a call to the servicing system made either by the remote system itself or by a caretaker or administrator of the remote system and reporting a problem with the remote system. This results in several inefficiencies. Firstly, two calls must be made: one to report the problem and the other to access the remote system. This means that two calls must be paid for, and that servicing of the remote site is delayed by the amount of time that it takes to establish the second call. Secondly, remote sites often do not have direct-inward-dialing links to their maintenance and diagnostics ports. So if the problem-reporting call is a voice call (e.g., from a caretaker or some other person to a service bureau technician or some other person) convoluted and time-consuming schemes must be employed to transfer both ends of the voice call to modems in order to establish a data connection between the remote site and the servicing system, followed by establishing a new voice call between the calling and called parties.

SUMMARY OF THE INVENTION

This invention is directed to solving these and other problems and disadvantages of the prior art. Generally according to the invention, simultaneous voice-and-data (SVD) equipment is employed automatically in a call between a remotely serviceable site and the site's remote servicing system, whereby both voice (e.g., a telephone call) communications and data service (e.g., a maintenance-and-diagnostics data) communications are established and remote servicing of the remote site is started via a single voice-and-data connection (e.g., a call) between the remote site and the servicing system, preferably immediately, automatically, and simultaneously with the voice call. Consequently, only a single call is used to both report a problem and to service the remote system, and servicing of the remote system begins upon establishment of the single call and without need for cumbersome call transfers. A service system technician or agent who receives the problem-reporting call is therefore often able to receive results of the remote servicing, and advise the person who is reporting the problem accordingly, at the time and in the same voice communication by which the problem is reported.

According to a first aspect of the invention, an apparatus comprises: remotely serviceable equipment (e.g. a communications switch or an adjunct thereof); remote servicing equipment (e.g., a remote maintenance and diagnostics system or a remote maintenance and diagnostics workstation) responsive to a data communications connection to the remotely serviceable equipment for servicing the remotely serviceable equipment via data communications; a first voice communications mechanism (e.g., a telephone) associated with the remotely serviceable equipment; a second voice communications mechanism (e.g., a telephone) associated with the remotely servicing equipment; a telecommunications link extending from the remotely serviceable equipment and the first voice communications mechanism to the remotely servicing equipment and the second voice communications mechanism; a simultaneous voice and data communications mechanism (e.g., SVD modems) for effecting a simultaneous voice and data communications single connection over the link; and an arrangement responsive to origination of voice communications between the first and the second voice communications mechanisms, for automatically causing the simultaneous voice and data communications mechanism to effect the simultaneous voice and data communications single connection over the link, connecting a voice portion of the simultaneous voice and data communications single connection to the first and the second voice communications mechanisms, and connecting a data portion of the simultaneous voice and data communications single connection to the remotely servicing and the remotely serviced equipment; whereby origination of the voice communications automatically results in the remote servicing equipment being connected to the remotely serviceable equipment via data communications on same said single connection as the voice communications.

According to a second aspect of the invention, an apparatus connectable by a telecommunications link to a first telephone and to a remote servicing arrangement comprises: a second telephone for effecting voice communications with the first telephone over the link; remotely serviceable equipment remotely serviceable by the remote servicing arrangement via data communications over the link; a simultaneous voice and data communications mechanism for effecting a simultaneous voice and data communications single connection over the link to the first telephone and the remote servicing arrangement; and an arrangement responsive to origination of voice communications between the first and the second telephones, for automatically causing the simultaneous voice and data communications mechanism to effect the simultaneous voice and data communications single connection, connecting a voice portion of the simultaneous voice and data communications single connection to the second telephone thereby to effect voice communications between the first and the second telephones, and connecting a data portion of the simultaneous voice and data communications single connection to the remotely serviceable equipment thereby to effect remote servicing of the remotely serviceable equipment by the remote servicing arrangement; whereby origination of the voice communications automatically results in the remote servicing arrangement servicing the remotely serviceable equipment via data communications on same said single connection as the voice communications.

According to a third aspect of the invention, an apparatus connectable by a telecommunications link to a first telephone and to a remotely serviceable arrangement comprises: a second telephone for effecting voice communications with the first telephone over the link; remote servicing equipment responsive to a data communications connection to the remotely serviceable arrangement, for servicing the remotely serviceable equipment via data communications; a simultaneous voice and data communications mechanism for affecting a simultaneous voice and data communications single connection over the link to the first telephone and the remotely serviceable arrangement; and an arrangement responsive to origination of voice communications between the first and the second telephones, for automatically causing the simultaneous voice and data communications mechanism to effect the simultaneous voice and data communications single connection, connecting a voice portion of the simultaneous voice and data single connection to the second telephone thereby to effect voice communications between the first and the second telephones, and connecting a data portion of the simultaneous voice and data communications single connection to the remote servicing equipment thereby to effect remote servicing of the remotely serviceable arrangement by the remote servicing equipment; whereby origination of the voice communications automatically results in the remote servicing equipment being connected to the remotely serviceable arrangement via data communications on same said single connection as the voice communication.

According to a fourth aspect of the invention, a method of effecting remote servicing of remotely serviceable equipment in a system comprising the remotely serviceable equipment and an associated first telephone, remote servicing equipment and an associated second telephone, a telecommunications link extending from the remotely serviceable equipment and the first telephone to the remote servicing equipment and the second telephone, and a simultaneous voice and data communications mechanism for effecting a simultaneous voice and data communications single connection over the link, comprises the steps of: in response to origination of voice communications between the first and the second telephones, automatically causing the simultaneous voice and data communications mechanism to effect the simultaneous voice and data communications single connection over the link; connecting a voice portion of the simultaneous voice and data communications single connection to the first and to the second telephones to effect voice communications between the first and the second telephones; connecting a data portion of the simultaneous voice and data communications single connection to the remotely serviceable equipment and the remotely servicing equipment; and in response to the connecting of the data portion, the remote servicing equipment remotely servicing the remotely serviceable equipment via data communications; whereby origination of the voice communications automatically results in the remote servicing equipment being connected to and servicing the remotely serviceable equipment via the data communications on same said single connection as the voice communications.

These and other advantages and features of the invention will become more apparent from the following description of an illustrative embodiment of the invention taken together with the drawing.

DETAILED DESCRIPTION

Figure 1:
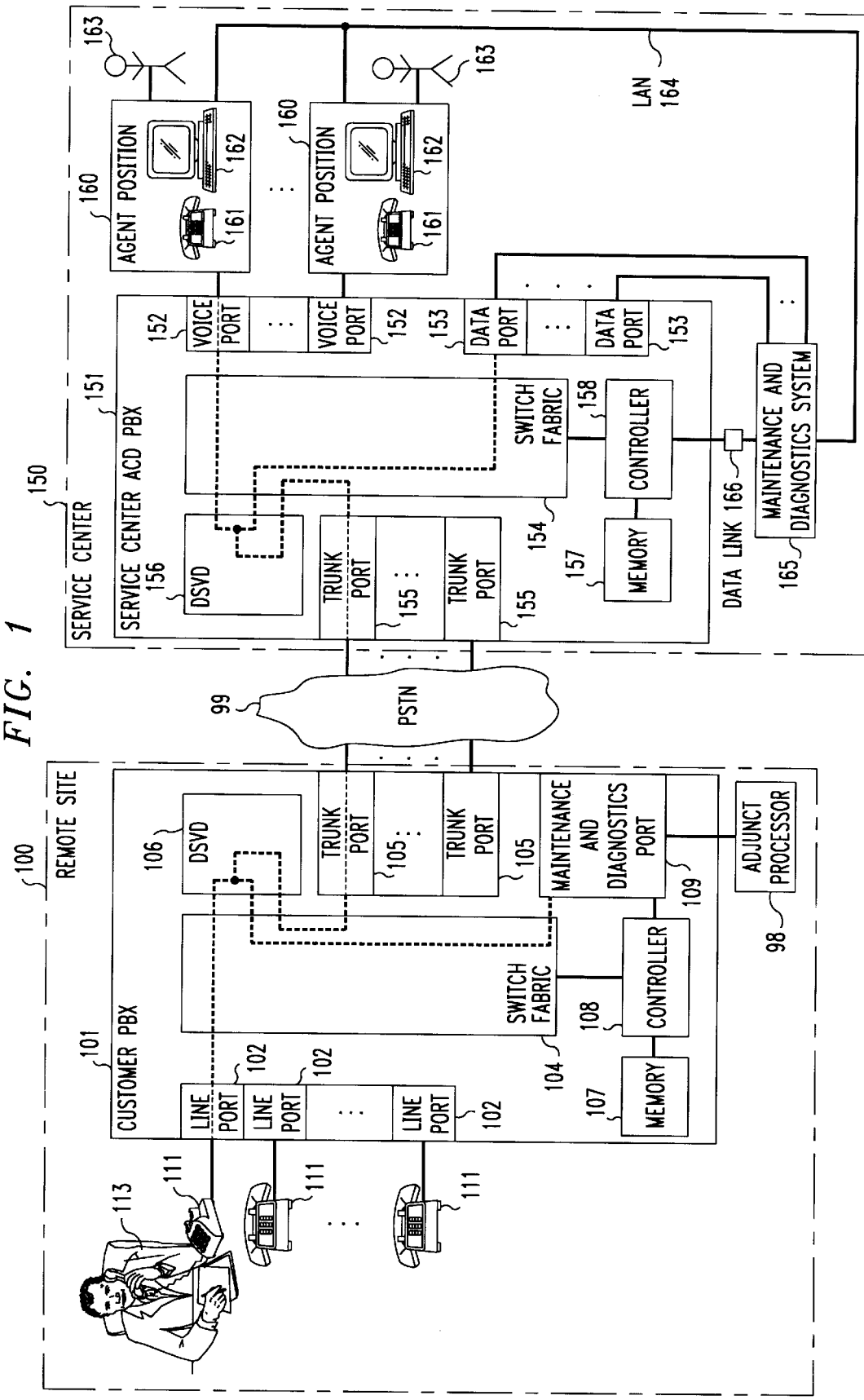
FIG. 1 is a block diagram of a telecommunications system that includes an illustrative embodiment of the invention.

FIG. 1 shows a telecommunications system comprising a service center 150 and a remote site 100 serviced by service center 150 and interconnected therewith by a communications system such as the public service telephone network (PSTN) 99. Remote site 100 comprises a customer private branch exchange (PBX) 101. PBX 101 is a stored-program-controlled switching system that includes a plurality of line ports 102 for connecting to communications sets such as telephones 111, a plurality of trunk ports 105 for connecting to PSTN 99, a switching fabric 104 that selectively interconnects line ports 102 with each other and with trunk ports 105, a controller 108 that controls the operation of switching fabric 104 and ports 102 and 105, a memory 107 that stores control programs for execution by controller 108, and a maintenance and diagnostics port 109 through which service center 150 can interrogate and examine the various units that make up PBX 101. Remote site 100 may also comprise equipment (e.g., an adjunct processor 98) that is networked with customer PBX 101 and which may be interrogated and examined via a facility, such as a maintenance and diagnostics port 109. As described so far, remote site 100 is conventional.

Service center 150 comprises a service center automatic call distribution (ACD) PBX 151, a plurality of service agent positions 160 each comprising a telephone 161 and a data terminal or workstation 162 for use by service agents 163, and a maintenance and diagnostics system 165 that is connected to data terminals or workstations 162 of service agent positions 160 by a local area network (LAN) 164. PBX 151 is a stored-program-controlled switching system that includes a plurality of trunk ports 155 for connecting to PSTN 99, a plurality of voice line ports 152 for connecting to telephones 161 of agent positions 160, a plurality of data line ports 153 at least some of which are connected to system 165, a switching fabric 154 that selectively interconnects line ports 152—153 with each other and with trunk ports 155, a controller 158 that controls the operation of switching fabric 154 and of ports 152, 153, and 155, and a memory 157 that stores control programs including ACD programs for execution by controller 158. Controller 158 communicates with system 165 via a data link 166 which typically includes a computer-telephony integration (CTI) system. As described so far, service center 150 is conventional.

Alternatively, system 165 is distributed and comprises workstations 162, with or without service agents 163. In that case, data ports 153 are connected directly to workstations 162.

According to the invention, customer PBX 101 is equipped with at least one digital simultaneous voice and data (DSVD) modem 106, and service center ACD PBX 151 is equipped with a plurality of DSVD modems 156—a DSVD modem pool. A DSVD modem is a conventional circuit that multiplexes/demultiplexed a digital voice and a digital data channel to/from a standard modem link. Illustrative makers of such modems are Hayes and AT&T Microelectronics. DSVD 106 is connected to switching fabric 104 for selective interconnection between line ports 102, maintenance and diagnostics port 109, and trunk ports 105. A modem pool of DSVDs 156 is connected to switching fabric 154 for selective interconnection between voice line ports 152, data line ports 153, and trunk ports 155. Further according to the invention, the call-processing control software stored in memories 107 and 157 is modified to provide the functionality flow charted in FIGS. 2 and 3, respectively.

Figure 2:
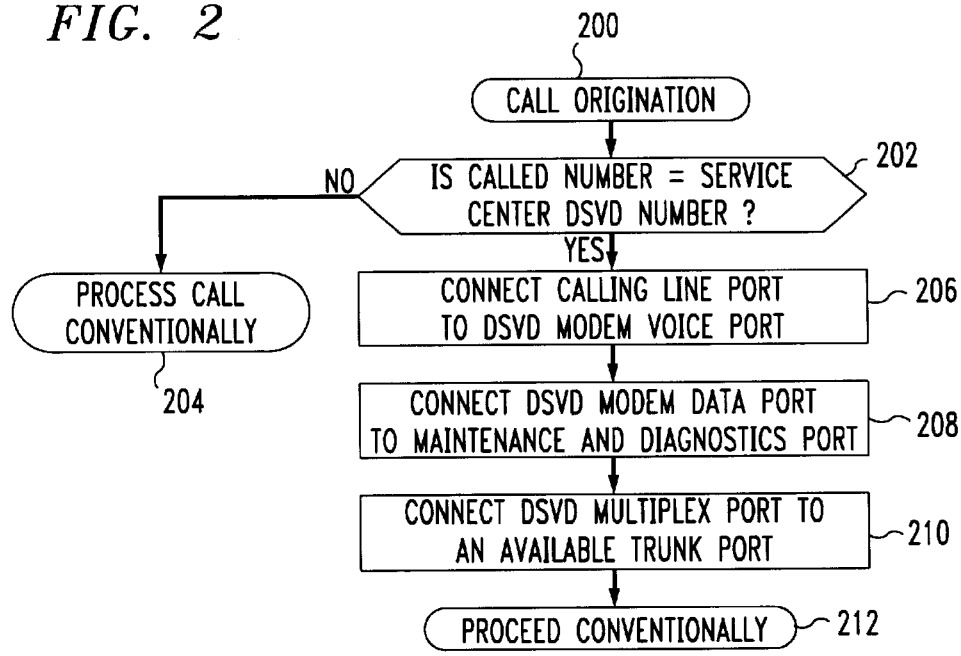
FIG. 2 is a flow chart of functionality related to the invention of a customer PBX of the system of FIG. 1.
Figure 3:
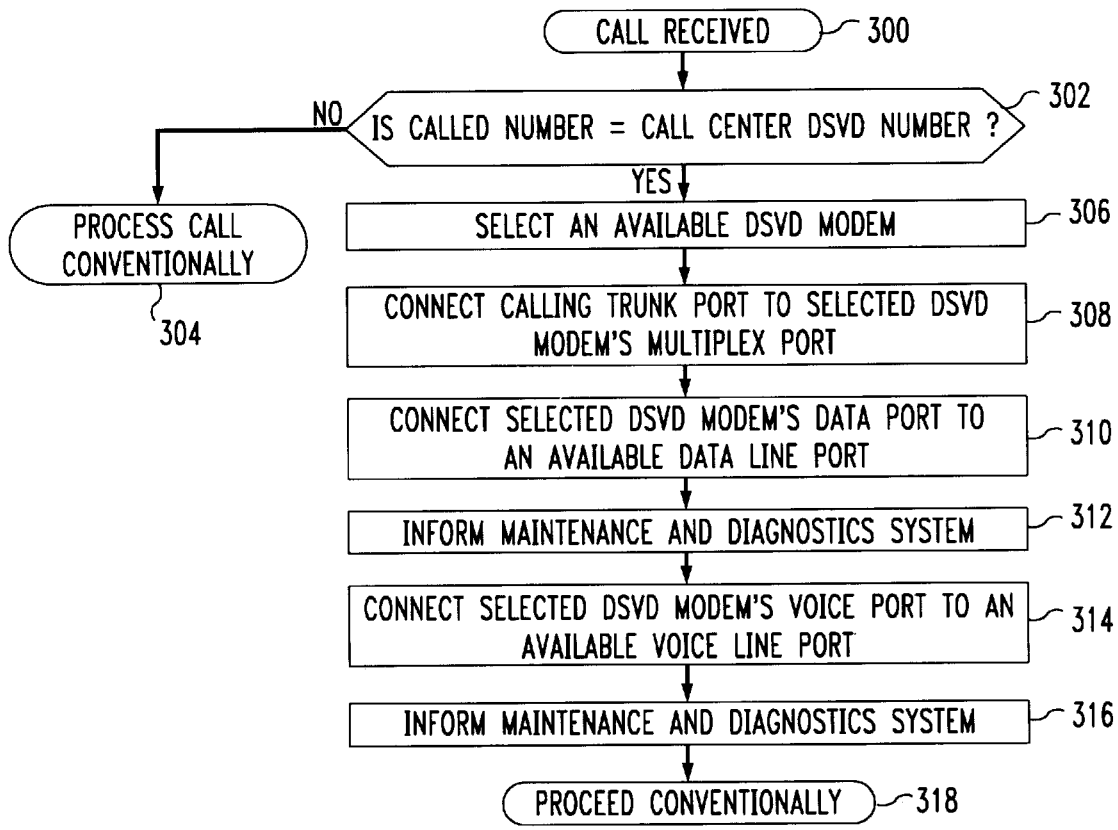
FIG. 3 is a flow chart of functionality related to the invention of a service center PBX of the system of FIG. 1.

An administrator 113 is provided with a predetermined one or more telephone numbers to call when experiencing a problem either with customer PBX 101 or with other customer equipment (e.g., adjunct processor 98) that is networked with customer PBX 101. This telephone number may be either a telephone number of service center 150 or a telephone number of DSVD modem pool 156. This telephone number is administered into control data stored in memory 107. As shown in FIG. 2, whenever a call is placed from any telephone 111, at step 200, controller 108 checks whether the called number is the predetermined telephone number, at step 202. If not, the call is processed conventionally, at step 204. But if the called number is the predetermined telephone number, controller 108 causes switching fabric 104 to connect the calling telephone's line port 102 to a voice port of DSVD modem 106, at step 206, the maintenance and diagnostics port 109 to a data port of DSVD modem 106, at step 208, and an available trunk port 105 to a multiplex port of DSVD modem 106, at step 210. DSVD modem 106 multiplexes its voice and data ports to its multiplex port in a conventional manner, thereby setting up a simultaneous voice and data call on the connected trunk port 105. This DSVD call is then processed and routed conventionally by controller 108, at step 212.

When the call from customer PBX 101 is received at service center ACD PBX 151, at step 300, controller 158 determines whether the incoming call is a DSVD call. Illustratively, controller 158 makes the determination on the basis of the called number, at step 302. If the call is not a DSVD call, controller 158 processes it conventionally, at step 304. But if the call is a DSVD call, controller 158 selects an available DSVD modem 156 from the pool of DSVD modems, at step 306, causes switching fabric 154 to connect the trunk port 155 on which the DSVD call is incoming to the multiplex port of the selected DSVD modem 156, at step 308, causes switch fabric 154 to connect the data port of the selected DSVD modem 156 to an available data port 153 that is connected to maintenance and diagnostics system 165 or to an available agent's workstation 162, at step 310, and in the former case informs system 165 thereof via data link 166, at step 312. Controller 158 also uses its conventional ACD functionality and switch fabric 154 to connect the voice port of the selected DSVD modem 156 to a voice port 152 serving an agent position 160 of the available service agent, at step 314, and optionally informs system 165 thereof via data link 166, at step 316. The remainder of processing of the DSVD call is conventional, at step 318. So is the activity of system 165 or workstations 162: in response to being informed at step 312 of the data connection made at step 310, system 165 or workstation 162 starts to communicate with maintenance and diagnostics port 109 of customer PBX 101 to perform its maintenance and diagnostic functions on PBX 101 or adjunct processor 98; and in response to being informed at step 316 of the voice connection made at step 314, system 165 sends its maintenance and diagnostics results and other data via LAN 164 to data terminal 162 of agent position 160 whose agent is handling the voice portion of the DSVD call and/or to a maintenance and diagnostics database. When the DSVD call ends, its tear-down is performed by both PBXs 101 and 151 in a conventional manner.

Of course, various changes and modifications to the illustrative embodiment described above will be apparent to those skilled in the art. For example, the DSVD call need not be initiated from the remote site, but may be initiated from the service center—when the time arrives for performing periodically-scheduled maintenance, for example. Or, system 165 need not communicate with agents 163. Such changes and modifications can be made without departing from the spirit and the scope of the invention and without diminishing its attendant advantages. It is therefore intended that such changes and modifications be covered by the following claims.

The invention claimed is:

1. An apparatus comprising:
a remotely serviceable equipment;
a remote servicing equipment responsive to a data communications connection to the remotely serviceable equipment for servicing the remotely serviceable equipment via data communications;
first voice communications mechanism associated with the remotely serviceable equipment;
second voice communications mechanism associated with the remotely servicing equipment;
a telecommunications link extending from the remotely serviceable equipment and the first voice communications mechanism to the remotely servicing equipment and the second voice communications mechanism;
simultaneous voice and data communications mechanism for effecting a simultaneous voice and data communications single connection over the link; and
an arrangement responsive to origination of voice communications between the first and the second voice communications mechanisms, for automatically causing the simultaneous voice and data communications mechanism to effect the simultaneous voice and data communications single connection over the link, connecting a voice portion of the simultaneous voice and data communications single connection to the first and the second voice communications mechanisms, and connecting a data portion of the simultaneous voice and data communications single connection to the remotely servicing and the remotely serviced equipment;
whereby origination of the voice communications automatically results in the remote servicing equipment being connected to the remotely serviceable equipment via data communications on same said single connection as the voice communications.

2. The apparatus of claim 1 wherein:
the simultaneous voice and data communications mechanism comprises
a first simultaneous voice and data modem associated with the remotely serviceable equipment and the first voice communications mechanism, and a second simultaneous voice and data modem associated with the remote servicing equipment and the second voice communications mechanism, each responsive to the causing arrangement for establishing a simultaneous voice and data communications single connection over the link with each other.

3. The apparatus of claim 2 wherein:
the causing arrangement comprises
first means associated with the remotely serviceable equipment, the first voice communications mechanism, and the first simultaneous voice and data modem, responsive to the origination of the voice-only communications between the first and the second voice communications mechanisms, for automatically causing the first simultaneous voice and data modem to effect the simultaneous voice and data communications single connection over the link with the second simultaneous voice and data modem, connecting the voice portion of the simultaneous voice and data communications single connection to the first voice communications mechanism, and connecting the data portion of the simultaneous voice and data communications single connection to the remotely serviceable equipment; and
second means associated with the remote servicing equipment, the second voice communications mechanism, and the second simultaneous voice and data modem, responsive to origination of the voice-only communications between the first and the second voice communications mechanisms, for automatically causing the second simultaneous voice and data modem to effect the simultaneous voice and data communications single connection over the link with the first simultaneous voice and data modem, connecting the voice portion of the simultaneous voice and data communications single connection to the second voice communications mechanism, and connecting the data portion of the simultaneous voice and data communications single connection to the remote servicing equipment.

4. The apparatus of claim 3 wherein:

the first means and the remotely serviceable equipment jointly comprise a first telephony switching system including a remote-servicing port; and the second means comprise a second telephony switching system.

5. An apparatus comprising:

a remotely serviceable first communications system, including a remote-access service port for providing remote-service data communications access to the remotely serviceable first communications system;

a first telephone connected to the first communications system;

a second communications switching system;

a second telephone connected to the second communications switching system;

a remote servicing apparatus connected to the second communications switching system, for automatically servicing the first communications system via data communications with the remote-access service port;

a communications link interconnecting the first communications system with the second communications switching system;

a first simultaneous voice and data modem at the first communications system, and a second simultaneous voice and data modem at the second communications switching system, each for establishing a simultaneous voice and data communications single connection over the link with each other;

an arrangement in the first communications system responsive to an origination of a voice call from the first telephone to the second telephone, for causing the first simultaneous-voice and data modem to establish a simultaneous voice and data connection over the link to the second communications switching system, and further for connecting a voice portion of the connection to the first telephone and connecting a data portion of the connection to the remote-access service port; and an arrangement in the second communications system responsive to the establishment of the simultaneous voice and data communications single connection over the link, for causing the second simultaneous voice and data modem to terminate the simultaneous voice and data communications single connection, and further for connecting the voice portion of the connection to the second telephone and connecting the data portion of the connection to the remote servicing apparatus;

whereby origination of the voice call automatically results in the remote servicing apparatus being connected to the first communications switching system via data communications on same said single connection as the voice communications.

6. The apparatus of claim 5 further comprising:

a data terminal associated with the second telephone and connected to the remote servicing apparatus; and an arrangement associated with the remote servicing apparatus for communicating results of the remote servicing to the data terminal.

7. An apparatus connectable by a telecommunications link to a first telephone and to a remote servicing arrangement, the apparatus comprising:

a second telephone for effecting voice communications with the first telephone over the link;

remotely serviceable equipment remotely serviceable by the remote servicing arrangement via data communications over the link;

a simultaneous voice and data communications mechanism for effecting a simultaneous voice and data communications single connection over the link to the first telephone and the remote servicing arrangement; and an arrangement responsive to origination of voice communications between the first and the second telephones, for automatically causing the simultaneous voice and data communications mechanism to effect the simultaneous voice and data communications single connection, connecting a voice portion of the simultaneous voice and data communications single connection to the second telephone thereby to effect voice communications between the first and the second telephones, and connecting a data portion of the simultaneous voice and data communications single connection to the remotely serviceable equipment thereby to effect remote servicing of the remotely serviceable equipment by the remote servicing arrangement;

whereby origination of the voice communications automatically results in the remote servicing arrangement being connected to the remotely serviceable equipment via data communications on same said single connection as the voice communications.

8. An apparatus connectable by a telecommunications link to a first telephone and to a remotely serviceable arrangement, the apparatus comprising:

a second telephone for effecting voice communications with the first telephone over the link;

remote servicing equipment responsive to a data communications connection to the remotely serviceable arrangement, for servicing the remotely serviceable equipment via data communications;

a simultaneous voice and data communications mechanism means for affecting a simultaneous voice and data communications single connection over the link to the first telephone and the remotely serviceable arrangement; and an arrangement responsive to origination of voice communications between the first and the second telephones, for automatically causing the simultaneous voice and data communications mechanism to effect the simultaneous voice and data communications single connection, connecting a voice portion of the simultaneous voice and data communications single connection to the second telephone thereby to effect voice communications between the first and the second telephones, and connecting a data portion of the simultaneous voice and data communications single connection to the remote servicing equipment thereby to effect remote servicing of the remotely serviceable arrangement by the remote servicing equipment;

whereby origination of the voice communications automatically results in the remote servicing equipment being connected to the remotely serviceable arrangement via data communications on same said single connection as the voice communication.

9. A method of effecting remote servicing of remotely serviceable equipment in a system comprising the remotely serviceable equipment and an associated first telephone, remote servicing equipment and an associated second telephone, a telecommunications link extending from the remotely serviceable equipment and the first telephone to the remote servicing equipment and the second telephone, and a simultaneous voice and data communications mechanism for effecting a simultaneous voice and data communications single connection over the link, comprising the steps of:

in response to origination of voice communications between the first and the second telephones, automatically causing the simultaneous voice and data communications mechanism arrangement to effect the simultaneous voice and data communications single connection over the link;

connecting a voice portion of the simultaneous voice and data communications single connection to the first and to the second telephones to effect voice communications between the first and the second telephones;

connecting a data portion of the simultaneous voice and data communications single connection to the remotely serviceable equipment and the remotely servicing equipment; and in response to the connecting of the data portion, the remote servicing equipment remotely servicing the remotely serviceable equipment via data communications;

whereby origination of the voice communications automatically results in the remote servicing equipment being connected to the remotely serviceable equipment and servicing the remotely serviceable equipment via the data communications on same said single connection as the voice communications.

* * * * *